United States Patent
Polyudov

(10) Patent No.: US 8,539,214 B1
(45) Date of Patent: *Sep. 17, 2013

(54) EXECUTION OF A PROGRAM MODULE WITHIN BOTH A PEI PHASE AND A DXE PHASE OF AN EFI FIRMWARE

(75) Inventor: Feliks Polyudov, Lilburn, GA (US)

(73) Assignee: American Megatrends, Inc., Norcross, FL (US)

( * ) Notice: Subject to any disclaimer, the term of this patent is extended or adjusted under 35 U.S.C. 154(b) by 799 days.

This patent is subject to a terminal disclaimer.

(21) Appl. No.: 12/722,088

(22) Filed: Mar. 11, 2010

Related U.S. Application Data

(63) Continuation of application No. 11/495,696, filed on Jul. 28, 2006, now Pat. No. 7,698,547.

(51) Int. Cl.
*G06F 9/00* (2006.01)
*G06F 15/177* (2006.01)

(52) U.S. Cl.
USPC .......................................................... 713/2

(58) Field of Classification Search
USPC ........................................ 713/1, 2; 711/166
See application file for complete search history.

(56) References Cited

U.S. PATENT DOCUMENTS

| | | | | |
|---|---|---|---|---|
| 5,671,413 A * | 9/1997 | Shipman et al. | ................... | 713/2 |
| 6,237,091 B1 * | 5/2001 | Firooz et al. | ..................... | 713/1 |
| 6,732,261 B2 * | 5/2004 | Chalmers et al. | ................. | 713/1 |
| 7,093,116 B2 * | 8/2006 | Chen et al. | ......................... | 713/1 |
| 7,493,460 B2 * | 2/2009 | Zimmer et al. | ............... | 711/166 |
| 2003/0056090 A1 * | 3/2003 | Khanna et al. | ..................... | 713/1 |
| 2007/0234350 A1 * | 10/2007 | Wang et al. | ................... | 717/174 |

OTHER PUBLICATIONS

Intel Platform Innovation Framework for EFI Pre-EFI Inilialization Core Interface Specification (PEI CIS), Ver. 0.91, Nov. 11, 2004.*

* cited by examiner

*Primary Examiner* — Kim Huynh
*Assistant Examiner* — Brandon Kinsey
(74) *Attorney, Agent, or Firm* — Hope Baldauff, LLC

(57) ABSTRACT

Methods, apparatus, and computer-readable media for executing the same program module in a PEI phase and a DXE phase are disclosed. According to one method, a program module is first executed in the PEI phase. While the program module is executing in the PEI, it stores the memory address of a DXE entry point in a hand-off block. When the DXE phase is entered, the stored DXE entry point for the program module is retrieved from the hand-off block and the program module is executed at the DXE entry point.

17 Claims, 7 Drawing Sheets

EXECUTION OF A PROGRAM MODULE WITHIN BOTH A PEI PHASE AND A DXE PHASE OF AN EFI FIRMWARE

CROSS REFERENCE TO RELATED APPLICATION

This application is a continuation of U.S. patent application Ser. No. 11/495,696 entitled "Execution of a Program Module Within Both a PEI Phase and a DXE Phase of an EFI Firmware," filed Jul. 28, 2006, now U.S. Pat. No. 7,698,547, issued Apr. 13, 2010, of which the entire contents is expressly incorporated herein by reference.

BACKGROUND

In many computing systems, low-level instruction code is used as an intermediary between the hardware components of the computing system and the operating software and other high-level software executing on the computing system. In some computer systems, this low-level instruction code is known as the Basic Input and Output System ("BIOS"). The BIOS provides a set of software routines that allow high-level software to interact with the hardware components of the computing system using standard calls.

Because of limitations of the BIOS in many PC-compatible computers, a new specification for creating the firmware that is responsible for booting the computer and for intermediating the communication between the operating system and the hardware has been created. The new specification is called the Extensible Firmware Interface ("EFI") Specification and is available from INTEL CORPORATION. The original EFI Specification from INTEL CORPORATION is also being extended by the Unified Extensible Firmware Interface Forum ("UEFI").

The EFI Specification describes an interface between the operating system and the system firmware. In particular, the Specification defines the interface that platform firmware must implement and the interface that the operating system may use in booting. How the firmware implements the interface is left up to the manufacturer of the firmware. The EFI Specification provides mechanisms for EFI drivers to communicate with each other, and the EFI core provides functions such as allocation of memory, creating events, setting the clock, and many others. This is accomplished through a formal and complete abstract specification of the software-visible interface presented to the operating system by the platform and the firmware.

INTEL CORPORATION has also provided further details regarding recommended implementation of EFI and UEFI in the form of The INTEL Platform Innovation Framework for EFI ("the Framework"). Unlike the EFI Specification, which focuses only on programmatic interfaces for the interactions between the operating system and system firmware, the Framework is a group of specifications that together describe a firmware implementation that has been designed to perform the full range of operations that are required to initialize the platform from power on through transfer of control to the operating system.

The Framework describes EFI firmware being executed in two major phases: the Pre-EFI Initialization ("PEI") phase and the Driver Execution Environment ("DXE") phase. PEI includes the minimum amount of program code needed to perform basic platform initialization and is executed from non-volatile memory. When PEI has completed its initialization, including the initialization of main memory, control passes to the DXE, which performs higher-level platform initialization and diagnostic functions. Pre-EFI Initialization modules ("PEIMs" or "modules") are specialized drivers that are executed during PEI. PEIMs are generally utilized to perform the actual hardware initialization that takes place during PEI.

It is sometimes desirable to have certain types of modules execute in both the PEI and the DXE. While the Framework provides limited functionality for executing a module in both the PEI phase and the DXE phase, the mechanism provided by the Framework to launch a module in both PEI and DXE suffers from several significant drawbacks. First, utilizing the mechanism provided by the Framework, the module is loaded once in PEI and then loaded again when DXE starts. Loading the module twice in this manner requires additional processing time, especially if the module must be decompressed prior to execution, and also consumes twice the memory. Second, there is a gap between the time the module is shut down in the PEI and the time the module is re-launched in the DXE. This gap causes an undesirable discontinuity of execution of the module.

It is with respect to these considerations and others that the various embodiments of the invention have been made.

SUMMARY

The above and other problems are solved by methods, apparatus, and computer-readable media for continuing the execution of a module from a PEI phase to a DXE phase. As described herein, modules executing within the PEI phase can be executed in the DXE without interruption. Moreover, modules executing within the PEI phase can be executed in the DXE without the need to load the module twice and without consuming twice as much memory.

According to one aspect of the disclosure presented herein, a method is provided for executing a program module within both a PEI phase and a DXE phase of an EFI-compatible firmware. According to the method, the program module is first executed in the PEI phase. While the program module is executing in the PEI, it stores the memory address of a DXE entry point. The DXE entry point is an address within the program module that should be utilized to execute the program module in the DXE phase. When the DXE phase is entered, the stored DXE entry point is retrieved and the program module is executed at the DXE entry point. The program module also has a PEI entry point that is utilized for executing the program module within the PEI phase.

According to aspects of the method, the program module is operative to create a hand-off block ("HOB") that is passed from the PEI phase to the DXE phase. The HOB is utilized by the program module to store the memory address of the DXE entry point. The HOB may be a globally unique identifier ("GUID") extension HOB adapted for storing the memory address of the DXE entry point.

According to other aspects of the method, a determination may be made prior to launching the program module in the DXE phase as to whether the program module is located in a read-only memory ("ROM"). If the program module is located in a ROM, the program module is relocated to a random access memory ("RAM") prior to executing the program module at the DXE entry point. When the program module is executed in the DXE phase, it may initialize itself for operation within the DXE, such as by installing a protocol through which its services are exposed to other programs executing within the DXE.

Aspects of the disclosure provided herein may also be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages will be apparent from a reading of the following detailed description and a review of the associated drawings.

DETAILED DESCRIPTION

Figure 1:
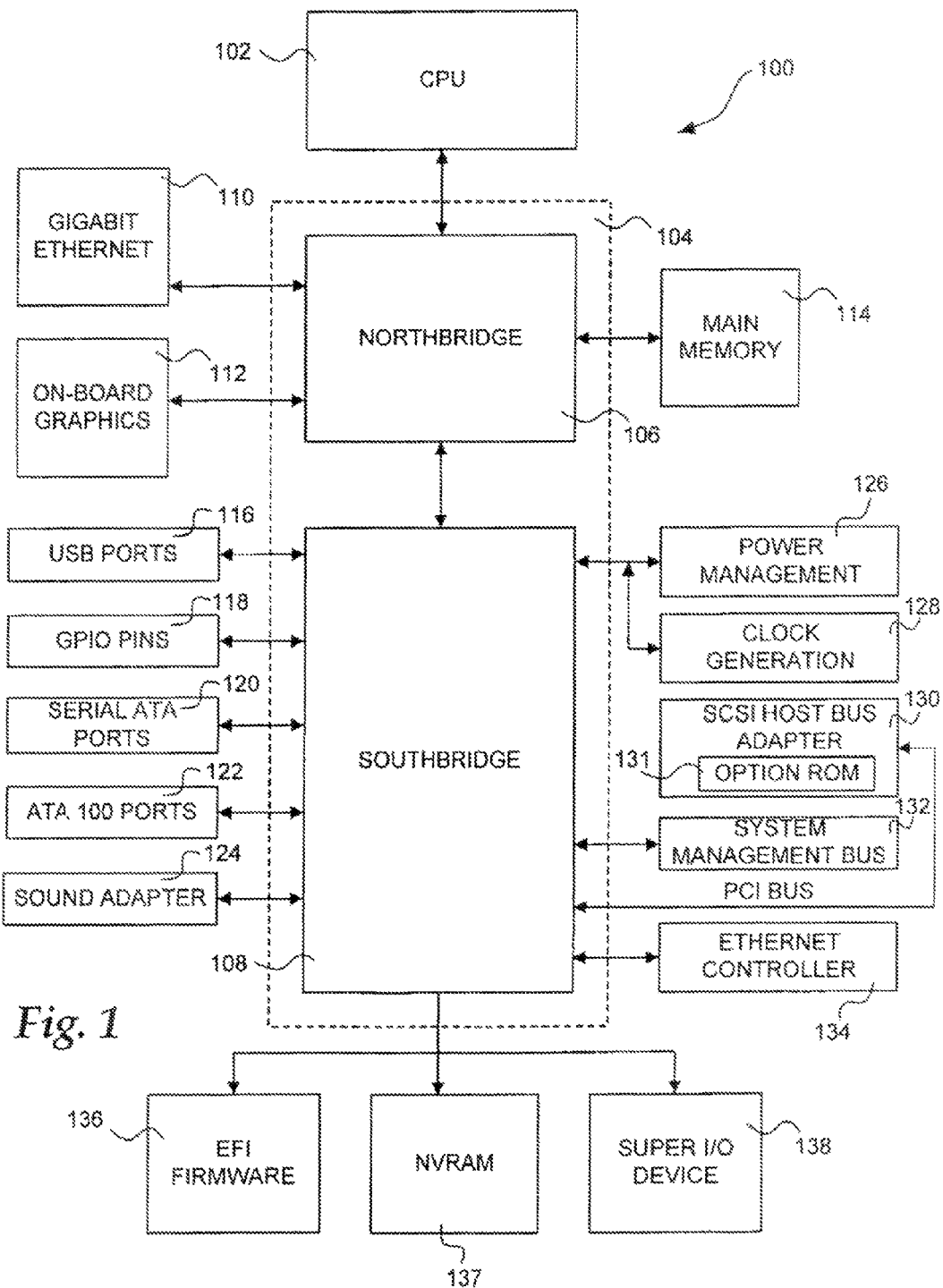
FIG. 1 is a computer architecture diagram that illustrates various components of a computer that provides an illustrative operating environment for the implementations presented herein.

Embodiments of the disclosure presented herein provide methods, systems, apparatuses, and computer-readable media for executing a program module in both a PEI phase and a DXE phase of firmware execution. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

FIG. 1 and the following discussion are intended to provide a brief, general description of a suitable computing environment in which the invention may be implemented. While the invention will be described in the general context of program modules that execute in conjunction with the execution of a computer firmware, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments discussed herein will be described. It should be appreciated that although the embodiments described herein are discussed in the context of a conventional desktop or server computer, the embodiments may be utilized with virtually any type of computing device. FIG. 1 shows an illustrative computer architecture for a computer 100 that is operative to provide and utilize a firmware capable of executing a program module in a PEI phase and a DXE phase.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a northbridge 106 and a southbridge 108. The northbridge 106 provides an interface between the CPU 102 and the remainder of the computer 100. The northbridge 106 also provides an interface to a random access memory ("RAM") used as the main memory 114 in the computer 100 and, possibly, to an on-board graphics adapter 112. The northbridge 106 may also include functionality for providing networking functionality through a gigabit Ethernet adapter 110. The gigabit Ethernet adapter 110 is capable of connecting the computer 100 to another computer via a network. Connections that may be made by the network adapter 110 may include local area network ("LAN") or wide area network ("WAN") connections. LAN and WAN networking environments are commonplace in offices, enterprise-wide computer networks, intranets, and the Internet. The northbridge 106 is connected to the southbridge 108.

The southbridge 108 is responsible for controlling many of the input/output functions of the computer 100. In particular, the southbridge 108 may provide one or more universal serial bus ("USB") ports 116, a sound adapter 124, an Ethernet controller 134, and one or more general purpose input/output ("GPIO") pins 118. The southbridge 108 may also provide a bus for interfacing peripheral card devices such as a BIOS boot system-compliant SCSI host bus adapter 130. In one embodiment, the bus comprises a peripheral component interconnect ("PCI") bus. The southbridge 108 may also provide a system management bus 132 for use in managing the various components of the computer 100. Power management circuitry 126 and clock generation circuitry 128 may also be utilized during the operation of the southbridge 108.

The southbridge 108 is also operative to provide one or more interfaces for connecting mass storage devices to the computer 100. For instance, according to an embodiment, the southbridge 108 includes a serial advanced technology attachment ("SATA") adapter for providing one or more SATA ports 120 and an ATA100 adapter for providing one or more ATA100 ports 122. The SATA ports 120 and the ATA100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the southbridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the southbridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computer 100 and to transfer information between elements within the computer 100. The EFI firmware 136 comprises a firmware that is compatible with the EFI Specification. Additional details regarding the operation of the EFI firmware 136 are provided below with respect to FIGS. 2-4. The LPC interface may also be utilized to connect a NVRAM 137 to the computer 100. The NVRAM 137 may be utilized by the firmware 136 to store configuration data for the computer 100. The configuration data for the computer 100 may also be stored on the same NVRAM 137 as the firmware 136.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
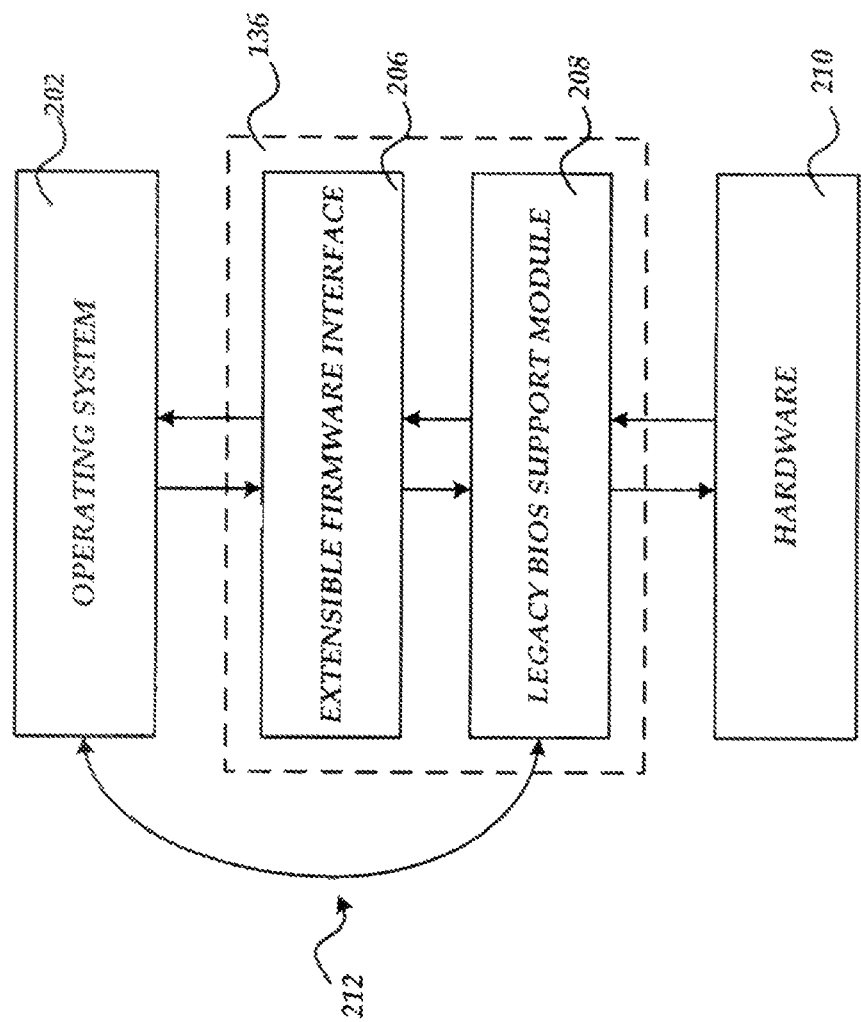
FIGS. 2-4 are software architecture diagrams that illustrate aspects of an EFI environment utilized by the embodiments presented herein.

Referring now to FIG. 2, additional details regarding the operation of the EFI firmware 136 of the computer 100 will be described. As described above, the firmware 136 comprises a firmware compatible with the EFI Specification from INTEL CORPORATION or from the UEFI FORUM. The EFI Specification describes an interface between the operating system 202 and the system firmware 136. The EFI Specification defines the interface that platform firmware must implement, and the interface that the operating system 202 may use in booting. How the firmware 136 implements the interface is left up to the manufacturer of the firmware. The intent of the Specification is to define a way for the operating system 202 and firmware 136 to communicate only information necessary to support the operating system boot process. This is accomplished through a formal and complete abstract Specification of the software-visible interface presented to the operating system by the platform and the firmware.

According to one implementation of EFI on INTEL CORPORATION IA-32 platforms, both the EFI 206 and a legacy BIOS support module 208 may be present in the firmware 136. This allows the computer 100 to support an EFI firmware interface and a legacy BIOS firmware interface. In order to provide this functionality, an interface 212 may be provided for use by legacy operating systems and applications. Additional details regarding the architecture and operation of the EFI 204 are provided below with respect to FIGS. 3-4. Additional details regarding the operation and architecture of EFI can be found in the EFI Specification and in the specifications that make up the Framework, both of which are available from INTEL CORPORATION and expressly incorporated herein by reference.

Figure 3:
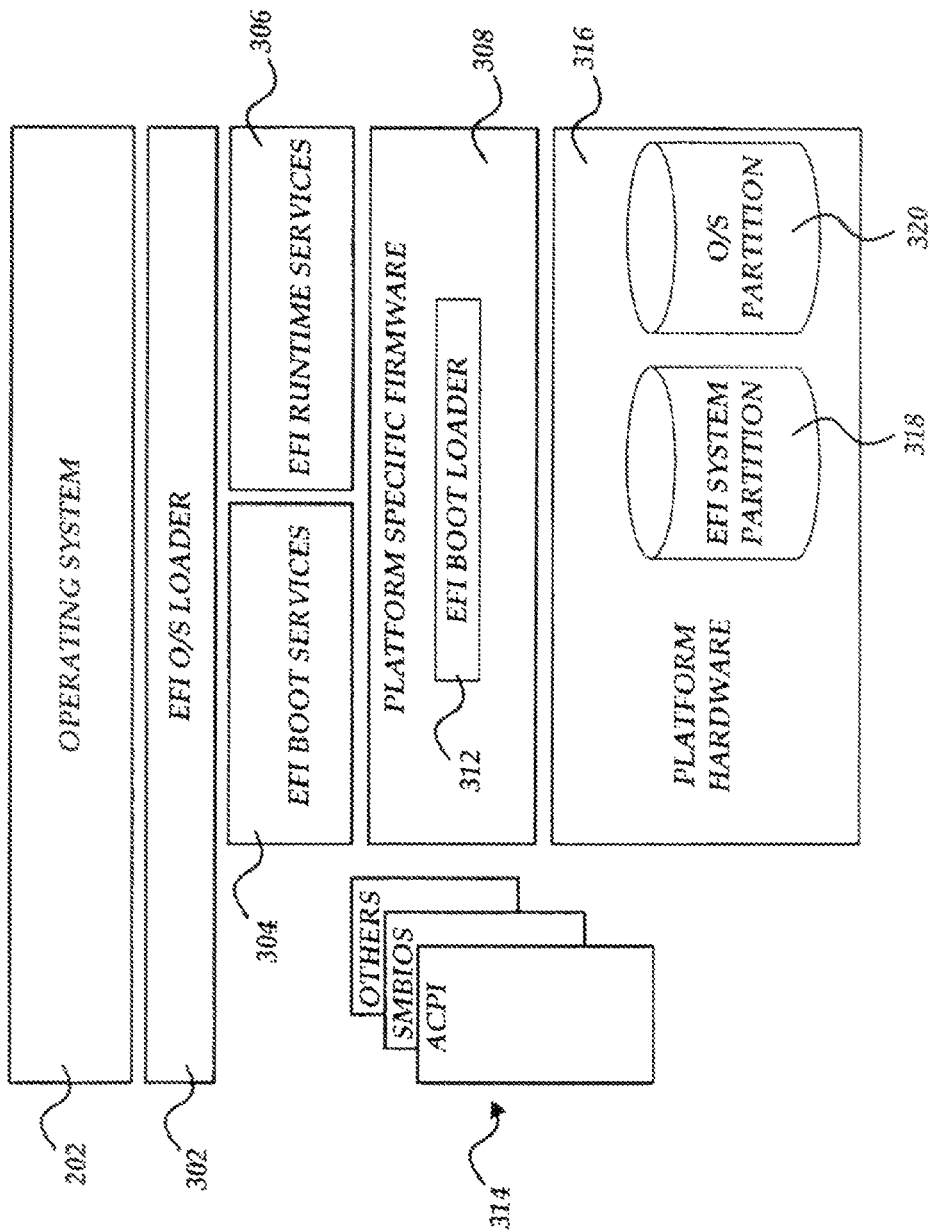

Turning now to FIG. 3, additional details regarding an EFI Specification-compliant system utilized to provide an operating environment for the various embodiments presented herein will be described. As shown in FIG. 3, the system includes platform hardware 316 and an operating system 202. The platform firmware 308 may retrieve an OS image from the EFI system partition 318 using an EFI O/S loader 302. The EFI system partition 318 may be an architecturally shareable system partition. As such, the EFI system partition 318 defines a partition and file system that are designed to allow safe sharing of mass storage between multiple vendors. An O/S partition 320 may also be utilized.

Once started, the EFI O/S loader 302 continues to boot the complete operating system 202. In doing so, the EFI O/S loader 302 may use EFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

EFI boot services 304 provides interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 312 at system boot time. The EFI boot loader 312 is a component in the EFI firmware that determines which program modules should be explicitly loaded and when. Once the EFI firmware is initialized, it passes control to the boot loader 312. The boot loader 312 is then responsible for determining which of the program modules to load and in what order.

Figure 4:
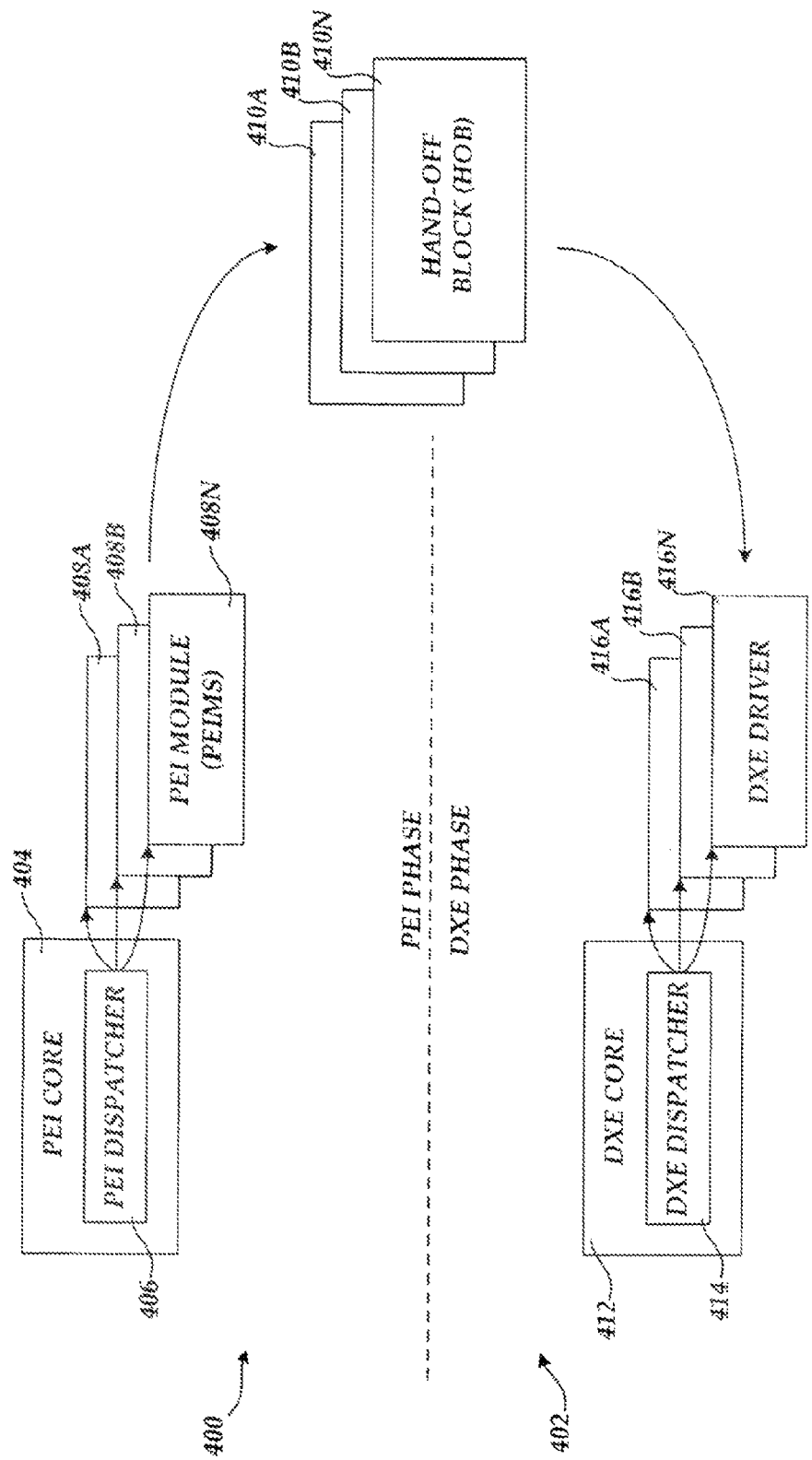

Referring now to FIG. 4, details regarding the various phases of execution of the EFI firmware 136 will be described. As discussed briefly above, an EFI firmware compatible with the Framework is executed in two major phases: the PEI phase 400 and the DXE phase 402. The PEI phase 400 includes the minimum amount of program code needed to perform basic platform initialization and is executed from non-volatile memory.

The operation of the PEI phase is controlled by core code called the PEI core 404. The PEI core 404 includes a PEI dispatcher 406 that is operative to identify and launch program modules within the PEI phase 400. More particularly, one or more PEI modules ("PEIMs") 408A-408N may also be utilized by the PEI core 404. The PEIMs 408A-408N are specialized plug-ins that execute within the PEI phase 400 in order to customize the operation of the PEI phase 400 to the platform. The PEI core 404 and the PEI dispatcher 406 provide functionality for locating, validating, and dispatching the PEIMs 408A-408N, facilitating communication between the PEIMs 408A-408N, and providing handoff data in the form of hand-off blocks ("HOBs") 410A-410N to the DXE phase 402, which is described below.

When the PEI phase 400 has completed its initialization, including the initialization of main memory, control passes to the DXE phase 402, which performs higher-level platform initialization and diagnostic functions. The operation of the DXE phase 402 is controlled by core code called the DXE core 412. The DXE core 412 is a boot service image that is responsible for producing EFI boot services, EFI runtime services, and DXE services. The DXE core 412 includes a DXE dispatcher 414 that discovers the DXE drivers 416A-416N stored in firmware volumes and executes them in the proper order.

The DXE drivers 416A-416N are required to initialize the processor, chipset, and platform. They are also required to produce DXE architectural protocols and any additional protocol services required to produce I/O abstractions and boot devices. The DXE drivers 416A-416N are the components that actually initialize the platform and provide the services required to boot an EFI-compliant operation system or a set of EFI-compliant system utilities. The DXE drivers 416A-416N may also expose their services for use by other DXE drivers through the use of a protocol interface.

As mentioned briefly above, the PEI phase 400 is operative to allocate a data store that is passed to the DXE phase 402 when the DXE phase 402 is invoked from the PEI phase 400. The basic container of data storage utilized for this purpose is called a hand-off block ("HOB"). The HOBs 410A-410N are allocated during the PEI phase 400 and passed to the DXE phase 402. The HOBs 410A-410N are allocated sequentially in memory that is available to executable content in the PEI phase 400. The sequential list of HOBs 410A-410N in memory are referred to as a HOB list.

A pointer to the list of HOBs 410A-410N is passed to the DXE phase 402 at the conclusion of the PEI phase 400. In this manner, data may be produced in the PEI phase 400 and utilized in the DXE phase 402. In this regard, the PEI phase 400 is considered a HOB producer phase and the DXE phase 402 is considered a HOB consumer phase. Additional details regarding the construction and use of hand-off blocks can be found in the INTEL Platform Innovation Framework for EFI Hand-Off Block Specification (the "HOB Specification"), which is publicly available from INTEL corporation.

Figure 5:
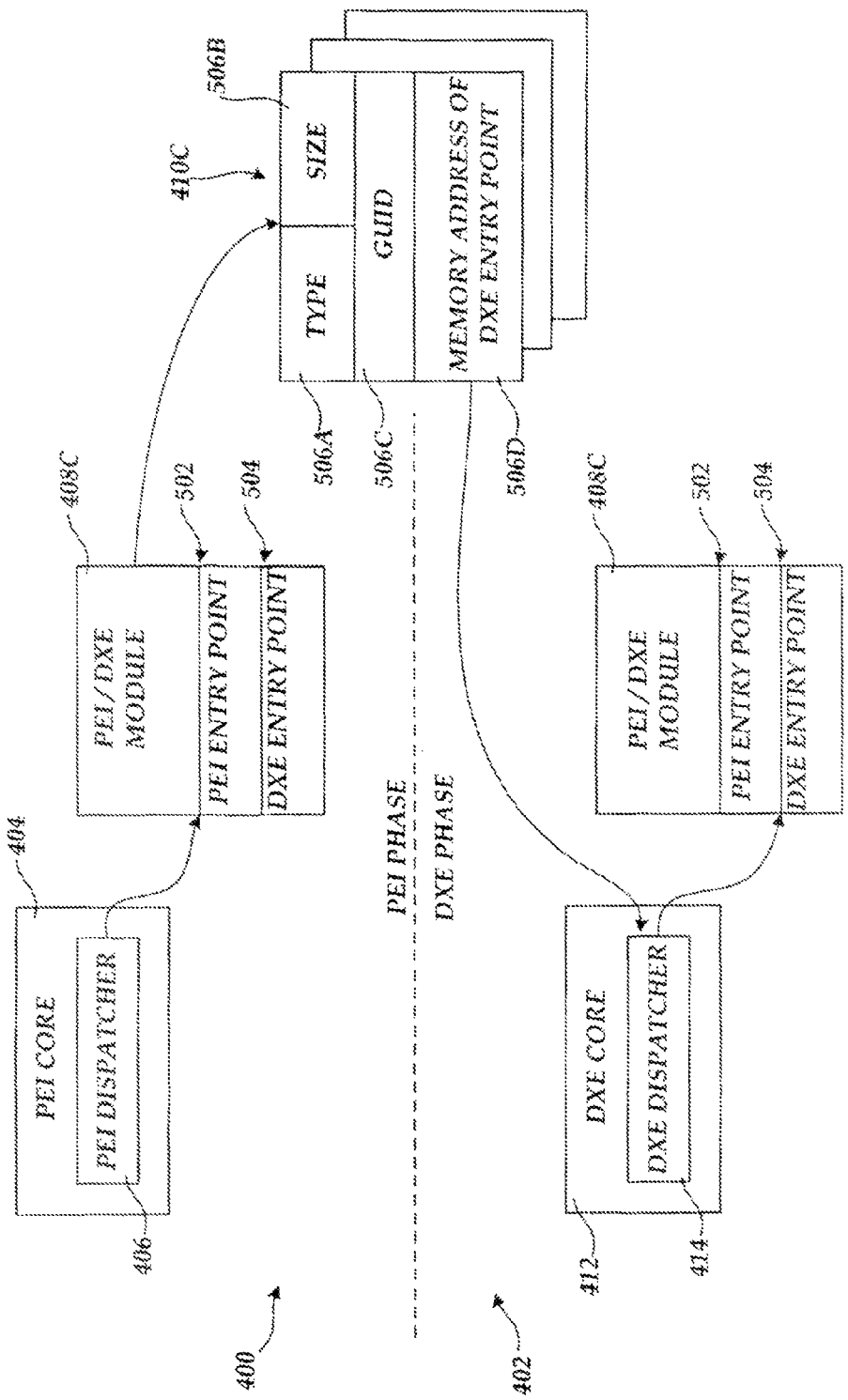
FIG. 5 is a software architecture diagram that shows aspects of an illustrative software architecture for executing a program module in both a PEI phase and a DXE phase according to one implementation.

Referring now to FIG. 5, additional details will be provided regarding one embodiment of the invention for executing a program module in both the PEI phase 400 and a DXE phase 402. In particular, FIG. 5 shows aspects of a module 408C that is operable to be executed in both the PEI phase 400 and the DXE phase 402. In order to enable this functionality, the module 408C exposes a DXE entry point 504. The DXE entry point 504 is an entry point into the module 408C at which execution of the module 408C is started in the DXE phase 402. Program code executed when a call is made to the DXE entry point 504 may include, for instance, program code for initializing the module 408C for operation in the DXE phase 402. As an example, the module 408C may install a protocol for exposing its services to other drivers executing within the DXE phase 402. Other similar initialization functions may also be performed.

In order to make the memory address of the DXE entry point 504 available to the DXE dispatcher 414, the module 408C is operative to create a HOB 410C during initialization in the PEI phase 400. The HOB 410C includes a data field 506A for storing type data that identifies the type of the HOB 410C. The HOB 410C also includes a data field 506B for storing data indicating the size of the data payload of the HOB 410C. The HOB 410C may also include a data field 506C that includes a GUID for the HOB 410C. The HOB 410C also includes a data field 506C that is utilized to store the memory address of the DXE entry point 504. According to embodiments, the HOB 410C may be implemented as a GUID Extension HOB as provided for in the HOB Specification. When the HOB 410C is implemented as a GUID Extension HOB, the contents of the data field 506C are utilized to determine the type of information stored in the HOB. For example, a GUID may be stored in the field 506C that indicates that the corresponding PEIM should be executed in both the PEI and the DXE phases. In particular, all PEIMs that are to continue execution in DXE should set the GUID stored in the data field 506C to DXE_GUID. In this manner, the data field 506C is utilized to indicate the type of data stored in the GUID Extension HOB.

According to aspects, the module 408C also includes a PEI entry point 502. The PEI entry point 502 is an entry point into the module 408C at which execution of the program module 408C is started during the PEI phase 400. Program code located at the PEI entry point 502 may include, for instance, program code for initializing the operation of the module 408C in the PEI phase 400, registering the services provided by the module 408C, and for performing other functions.

As will be described in greater detail below with respect to FIGS. 6 and 7, when the DXE phase 402 is initiated, the DXE dispatcher 414 is operative to identify the HOBs for modules that should be launched in the DXE phase 402. The DXE dispatcher 414 is then operative to retrieve the memory address of the DXE entry point 504 for these modules from the data field 506D of the appropriate HOB, and to begin executing the modules at the DXE entry point in the DXE phase 402. In this manner, the same module can be executed in both the PEI phase 400 and the DXE phase 402. Additional details regarding this process are described below with reference to FIGS. 6 and 7.

Figure 6:
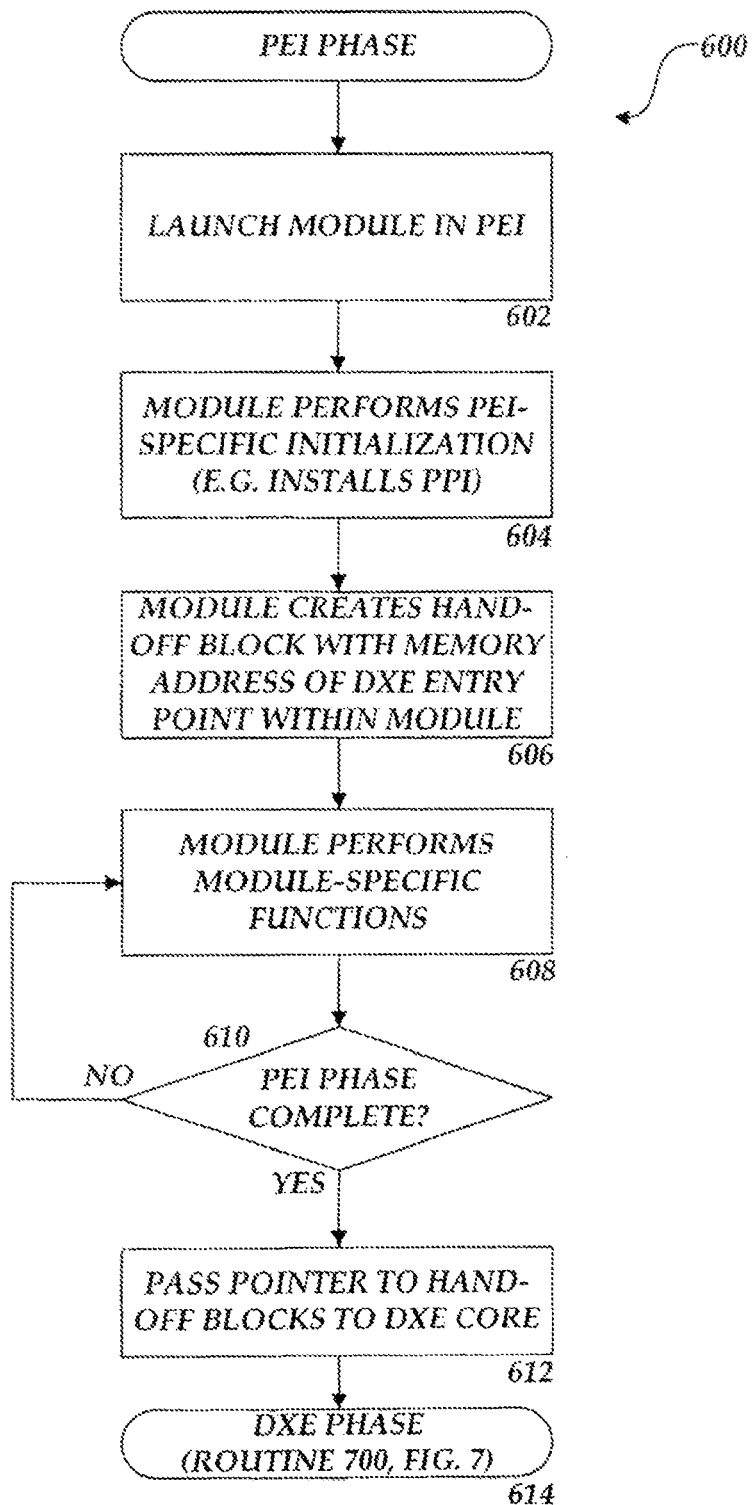
FIGS. 6-7 are flow diagrams showing processes for executing a program module in a PEI phase and a DXE phase according to one implementation.

Referring now to FIG. 6, an illustrative routine 600 will be described in detail for performing the operations in the PEI phase 400 for enabling a module to also be executed in the DXE phase 402. The logical operations of the various embodiments described herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 600 begins at operation 602, where the module 408C is launched in the PEI phase 400. At operation 602, the module 408C performs its PEI-specific initialization. For instance, the module 408C may install a PEIM-to-PEIM interface ("PPI") to expose its services to other modules executing within the PEI phase 400. As a part of its initialization, the module 408C may also create the HOB 410C. As discussed above, the HOB 410C includes the memory address of the DXE entry point 504 for the module 408C. This occurs at operation 606.

From operation 606, the routine 600 continues to operation 608 where the module performs its PEI phase processing. Once the PEI phase 400 has completed, the routine 600 continues from operation 610 to operation 612, where the PEI core 404 provides the DXE core 412 with a pointer to the list of HOBs. Once this has occurred, the routine 600 continues to operation 614, where the DXE phase 402 begins. The relevant aspects of the operation of the DXE phase 402 are described below with respect to FIG. 7.

Figure 7:
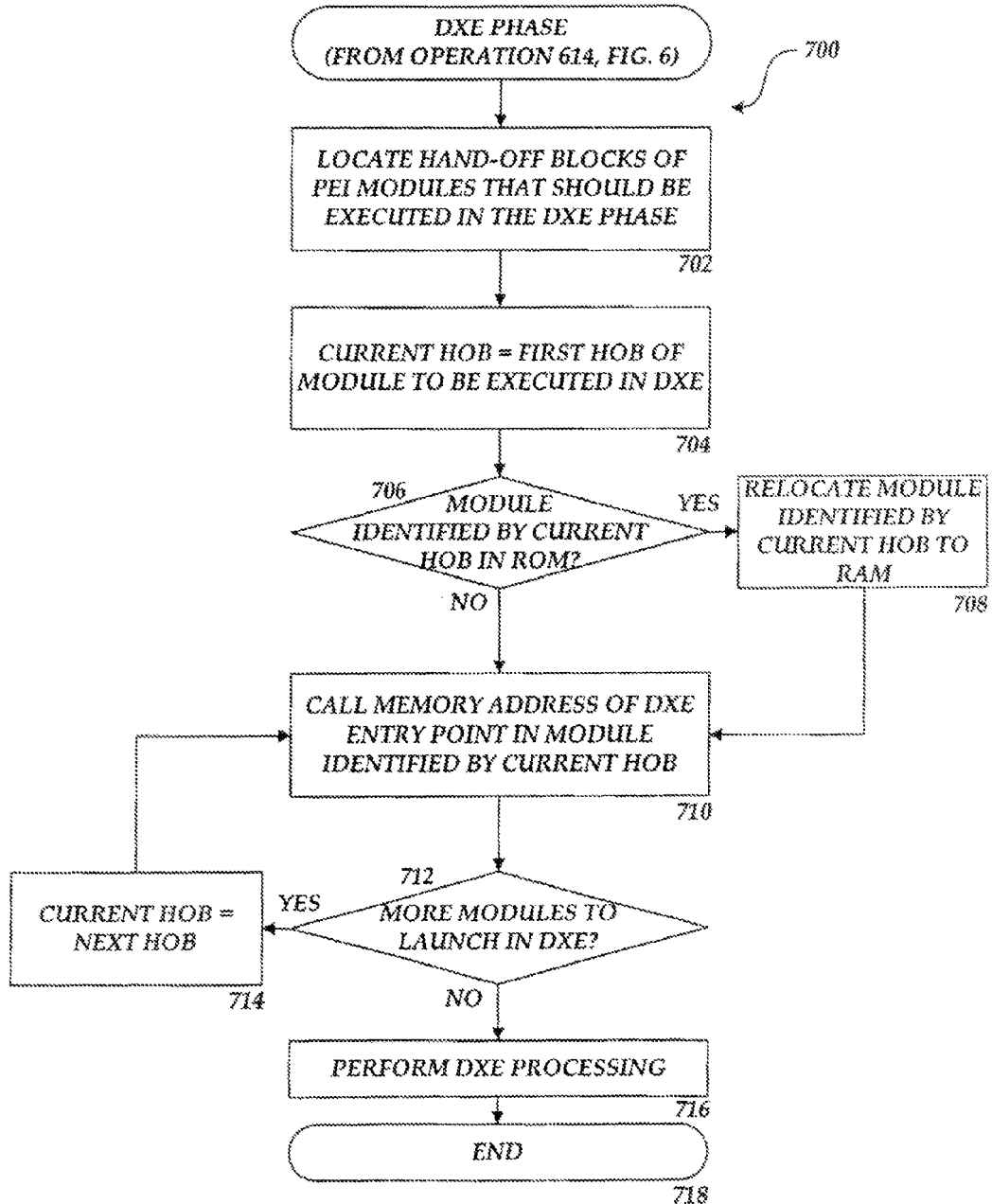

Referring now to FIG. 7, an illustrative routine 700 will be described in detail for performing the operations in the DXE phase 402 for continuing the execution of a program module that was executing in the PEI phase 400. In particular, the routine 700 begins at operation 702, where the DXE dispatcher 414 locates the HOBs for modules that should be executed in the DXE phase 402. In this regard, the contents of the data fields 506A and 506C may include a data type and a GUID that indicates to the DXE dispatcher 414 that the HOB contains the memory address of a DXE entry point for the module. Once the DXE dispatcher 414 has identified the HOBs of the modules to be executed, the DXE launches each of the modules by executing the modules at their DXE entry point.

In one implementation, the DXE dispatcher 414 is operative to determine whether each module to be launched is located in a ROM, such as the NVRAM 137. If so, the DXE dispatcher 414 relocates the module to RAM, such as the main memory 114, prior to launching the module in the DXE phase 402. The DXE dispatcher 414 adjusts the DXE entry point to reflect the new location of the module in the RAM. These processes occur at operations 704, 706, and 708. In this manner, program modules stored in a slower ROM device are relocated to a faster RAM device prior to execution within the DXE phase 402.

At operation 710, the DXE dispatcher 414 calls the DXE entry points of the modules, thereby executing the modules in the DXE phase 402. As discussed above, when a module is launched in the DXE phase 402, the module may create a protocol thereby exposing its services to other drivers executing within the DXE phase 402. Modules may also perform other types of initialization functions. Once all of the modules have been launched in the DXE phase 402, the routine 700 continues to operation 716, where the modules and the DXE core 412 perform their DXE phase processing. From operation 716, the routine 700 continues to operation 718, where it ends.

It should be appreciated that embodiments described herein provide methods, systems, apparatus, and computer-readable media for executing a program module in both the PEI phase and the DXE phase of a computer firmware. Although the disclosure presented herein has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A computer system for executing a program module within both a pre-extensible firmware interface (EFI) initialization environment (PEI) and a driver execution environment (DXE) of an EFI-compatible firmware, the computer system comprising:
    a processor;
    a memory coupled to the processor; and
    an application which executes in the processor from the memory and, when executed by the processor, causes the computer system to execute the program module within both the PEI and the DXE of the application by executing the program module in the PEI,
        while executing the program module in the PEI, storing a DXE entry point for executing the program module in the DXE, and
        while in the DXE, retrieving the stored DXE entry point and executing the program module at the DXE entry point.

2. The computer system of claim 1, wherein storing a DXE entry point for executing the program module in the DXE comprises creating a hand-off block (HOB) that is passed from the PEI to the DXE, the HOB storing the DXE entry point for the program module.

3. The computer system of claim 2, wherein the HOB comprises a globally unique identifier (GUID) extension HOB.

4. The computer system of claim 3, wherein executing the program module at the DXE entry point comprises:
    determining in the DXE if the program module is located in a read-only memory (ROM);
    relocating the program module to a random access memory (RAM) if the program module is located in a ROM; and
    executing the relocated program module at the DXE entry point.

5. The computer system of claim 4, wherein, in response to being executed at the DXE entry point, the program module is configured to install a protocol in the DXE.

6. The computer system of claim 5, wherein the program module further comprises a PEI entry point for executing the program module in the PEI.

7. The computer system of claim 1, wherein the application comprises EFI-compatible firmware.

8. A computer system for continuing an execution of a program module from within a pre-extensible firmware interface initialization (PEI) environment to a driver execution environment (DXE), the computer system comprising:
    a processor;
    a memory coupled to the processor; and
    an application which executes in the processor from the memory and, when executed by the processor, causes the computer system to continue the execution of the program module within both the PEI and the DXE of the application by
        creating a hand-off block (HOB) during the execution of the program module in the PEI, the HOB identifying the module as a module that should also be executed in the DXE and storing an entry point memory address for executing the program module in the DXE,
        retrieving the entry point memory address during execution of the DXE, and
        executing the program module from the entry point memory address.

9. The computer system of claim 8, wherein executing the program module from the entry point memory address during the DXE comprises:

determining if the program module is located in a read-only memory (ROM); and if the program module is in a ROM,
- relocating the program module from the read-only memory (ROM) to a random access memory (RAM), and
- executing the relocated program module from the RAM at the entry point memory address.

10. The computer system of claim 9, wherein, in response to being executed at the entry point memory address, the program module is configured to install a protocol in the DXE.

11. The computer system of claim 10, wherein the program module further comprises a second entry point memory address utilized for executing the program module in the PEI.

12. The computer system of claim 8, wherein the application comprises EFI-compatible firmware.

13. The computer system of claim 8, wherein the HOB comprises a globally unique identifier (GUID) extension HOB.

14. A computer system comprising:
- a processor;
- a memory coupled to the processor; and
- a firmware which executes in the processor from the memory and, when executed by the processor, causes the computer system to
  - execute in a pre-extensible firmware interface initialization (PEI) phase and a driver execution environment (DXE) phase,
  - during the DXE phase, retrieve an entry point memory address for a program module that should be executed during both the PEI phase and the DXE phase, wherein the entry point memory address is stored in a hand-off block (HOB) created by the program module during its execution in the PEI phase, and wherein the HOB further comprises data indicating that the program module should be executed in both the PEI phase and the DXE phase, and
  - execute the program module from the entry point memory address during the DXE phase.

15. The computer system of claim 14, wherein the firmware further causes the computer system to:
- determine, prior to executing the program module in the DXE phase, whether the program module is located in a read-only memory (ROM); and
- if the program module is in the ROM, relocate the program module to a random access memory (RAM) for execution.

16. The computer system of claim 15, wherein the program module is configured to install a protocol in the DXE phase in response to being executed from the entry point memory address.

17. The computer system of claim 16, wherein the program module further comprises a second entry point memory address utilized for executing the program module in the PEI.

* * * * *